United States Patent
Stern et al.

(10) Patent No.: US 8,996,623 B2
(45) Date of Patent: Mar. 31, 2015

(54) COST MANAGEMENT FOR MESSAGES

(75) Inventors: Edith H. Stern, Yorktown Heights, NY (US); Patrick J. O'Sullivan, Dublin (IE); Liam Harpur, Dublin (IE); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 12/577,879

(22) Filed: Oct. 13, 2009

(65) Prior Publication Data

US 2011/0087741 A1    Apr. 14, 2011

(51) Int. Cl.
*G06F 15/16*    (2006.01)
*G06Q 10/10*    (2012.01)

(52) U.S. Cl.
CPC ................................ *G06Q 10/107* (2013.01)
USPC .......................................... 709/206; 709/219

(58) Field of Classification Search
CPC ..................................................... G06Q 10/107
USPC .................................................. 709/219, 206
See application file for complete search history.

(56) References Cited

U.S. PATENT DOCUMENTS

| | | | |
|---|---|---|---|
| 5,983,270 A * | 11/1999 | Abraham et al. ............. | 709/224 |
| 6,055,240 A | 4/2000 | Tunnicliffe | |
| 6,233,313 B1 | 5/2001 | Farris et al. | |
| 6,504,907 B1 | 1/2003 | Farris et al. | |
| 6,768,722 B1 | 7/2004 | Katseff et al. | |
| 6,772,209 B1 | 8/2004 | Chernock et al. | |
| 7,478,129 B1 * | 1/2009 | Chemtob ....................... | 709/204 |
| 8,095,597 B2 * | 1/2012 | Rawat et al. .................. | 709/206 |
| 8,271,596 B1 * | 9/2012 | Haskins et al. ................ | 709/206 |
| 2003/0050981 A1 * | 3/2003 | Banerjee et al. .............. | 709/206 |
| 2004/0044600 A1 | 3/2004 | Chu et al. | |
| 2004/0083389 A1 * | 4/2004 | Yoshida ......................... | 713/201 |
| 2004/0199597 A1 * | 10/2004 | Libbey et al. ................. | 709/207 |
| 2005/0182735 A1 * | 8/2005 | Zager et al. ..................... | 705/67 |
| 2005/0186974 A1 * | 8/2005 | Cai ................................ | 455/466 |
| 2006/0041505 A1 * | 2/2006 | Enyart ............................ | 705/40 |
| 2006/0047766 A1 * | 3/2006 | Spadea, III .................... | 709/206 |
| 2006/0092920 A1 * | 5/2006 | Karamchedu et al. ........ | 370/352 |
| 2009/0113001 A1 * | 4/2009 | Manning et al. .............. | 709/206 |
| 2009/0307326 A1 * | 12/2009 | Landsman et al. ............ | 709/206 |
| 2010/0082756 A1 * | 4/2010 | Bryan et al. ................... | 709/206 |
| 2010/0174784 A1 * | 7/2010 | Levey et al. ................... | 709/206 |
| 2010/0211644 A1 * | 8/2010 | Lavoie et al. .................. | 709/206 |
| 2011/0022664 A1 * | 1/2011 | Ainsworth ..................... | 709/206 |
| 2011/0119048 A1 * | 5/2011 | Shaw .............................. | 704/9 |
| 2012/0173644 A1 * | 7/2012 | Brown et al. .................. | 709/206 |

OTHER PUBLICATIONS

Oleink, A method that uses cost feedback and cost limits to control that amount of email inside an organization, Aug. 2003.*

* cited by examiner

*Primary Examiner* — Joseph E Avellino
*Assistant Examiner* — James Conaway
(74) *Attorney, Agent, or Firm* — Moore & Van Allen PLLC

(57) ABSTRACT

Messages are managed for cost. A processing device includes receiving a message designating a recipient and determining a cost associated with the message.

23 Claims, 5 Drawing Sheets

COST MANAGEMENT FOR MESSAGES

BACKGROUND

The present invention is related to sending and receiving messages, and more specifically to cost management for messages.

In today's collaborative world there is a cost associated with message threads such as emails. The costs associated with message threads are due to, for example, long running message threads excessively using up valuable time for all the recipients, recipients (or their respective managers) not knowing the true cost of a message or thread, recipients (or their respective managers), not being able to effectively manage these message threads according to defined cost constraints, etc. The cost may be in terms of many factors such as, for example, time, resources used, energy costs, bandwidth costs, processing time, etc.

BRIEF SUMMARY

According to one aspect of the present invention, a method for cost management for messages operable on a processing device includes receiving, by a processing device, a message designating a recipient, and determining, by the processing device, a cost associated with the message.

According to another aspect of the present invention, a computing device for cost management for messages includes a network interface, the network interface being configured to receive a message designating a recipient, and a processor, the processor configured to determine a cost associated with the message.

According to a further aspect of the present invention, a computer program product including a computer readable storage medium comprising computer readable program code embodied therein, the computer readable medium including computer readable program code configured to receive a message designating a recipient, and computer readable program code configured to determine a cost associated with the message.

BRIEF DESCRIPTION OF THE DRAWINGS

Aspects of the present invention are further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1:
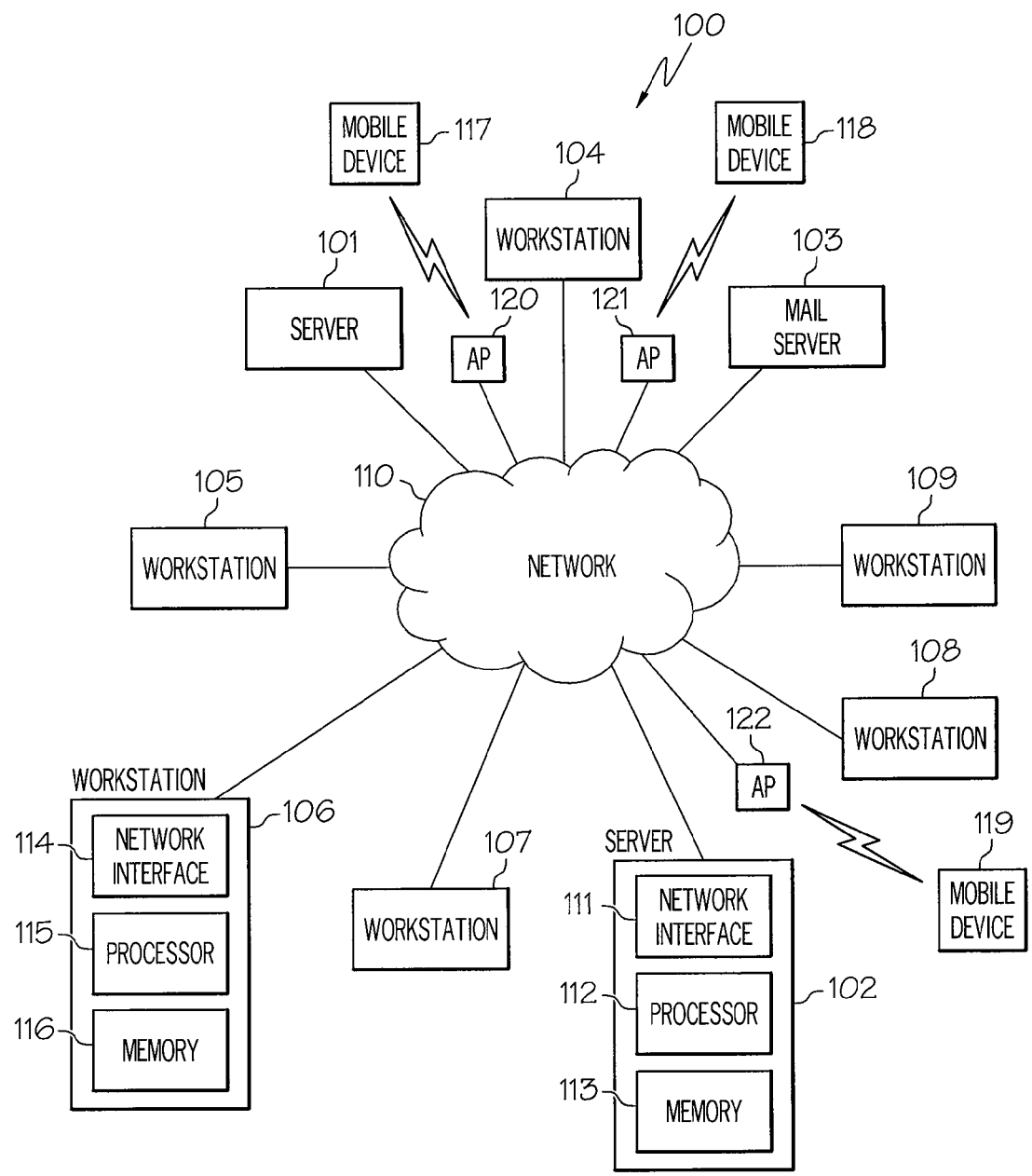
FIG. 1 is a diagram of a system for controlling messages according to an exemplary embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments according to the present invention provide the ability to associate a cost (e.g. financial, time, resources used, efficiency, etc.) with a message or a message thread and to generate a notification or report to help implement the cost limitation. Some message threads may end quickly but unfortunately, some message threads (e.g., email), may go on for a long period of time suggesting that it if the message thread starts to get expensive it may be more cost effective to hold a meeting. Embodiments according to the present invention track and provide feedback on how much a message string has cost where the cost may include costs associated with a sender of the message as well as costs associated with each recipient that receives and reads the message. From these costs, an ongoing aggregated cost may be determined and presented to new recipients for determination of whether to receive or not to receive a message, and whether to add additional messages to the string.

Therefore, associated with each message is a cost/weighting that may be associated with various factors such as time used sending and/or receiving the message by a person. A cost may be associated with a sender's time to compose the message as well as a cost associated with a recipient's time to read it and an associated cost related to resources (e.g., computer, work station, server, electricity, etc.) used to perform the sending and receiving of the message. Alternatively, according to embodiments of the present invention, the cost may be determined using a points system (e.g., a message may have a 20% rating associated with it, where 100% represents the most expensive message). The costs may be assigned and/or tracked by a processing device such as a server. If the messages tracked are email messages, an email server may be configured to perform the assigning and/or tracking of costs associated with messages.

A cost of a message may be dependent on and may increase responsive to a number of individuals/recipients of the message as well as how long a period of time the message has been active. According to embodiments of the present invention, cost information associated with a message may be used to influence the behavior of the recipients. For example, if a recipient receives a message that shows that $4,000 has been used in the message thread thus far, then the recipient may be more likely to try to minimize response and therefore incremental cost for the message string. The messaging system, and/or the recipient, may influence the senders of messages to only include recipients and attachments that are really necessary.

Embodiments according to the present invention may provide management of messages at a defined threshold (e.g., "shredding"—deleting, modifying, or disabling the message once it has reached a defined cost point), as well as, message thread costing (e.g., used to influence behavior of recipients and for billing purposes). Once a certain cost/value of a message thread has been reached or exceeded, an escalation notification may be made to the original sender or to an administrator or relevant manager that the cost of the message has exceeded an allowable threshold. The manager or system may decide to "disable" the message and automatically request that the recipients, including the sender, schedule a meeting as an alternative. Moreover, according to embodiments of the present invention, a message may be cost skewed in relation to a person's time (e.g., one may be allowed to take a certain amount of their manager's time in the day). A budget associated with sending and receiving of messages may be set on a daily basis, weekly basis, etc. and may be reset periodically (e.g., every day, every week, etc.).

In addition, according to embodiments of the present invention, a message may be configured such that once the cost associated with the message has reached a certain value (dollar amount, point amount, etc.) then the message may not be constrained from further forwarding. This restraint/threshold may be set initially at the start of the message strand or at any time. This may be set up by a sender of the message, a manager with the appropriate authority, as a system default, or by any other means. In addition, a system may be configured such that a warning notification is sent if a message thread hits a predefined value. In addition, according to embodiments of the present invention, a processing device, server or system may also be configured such that when a message thread is deemed to have increased in value, the cost limit associated with the message thread may be increased. A processing device, server or system according to the present invention may be configured such that attachment size is considered in assigning cost. For example, a brief email with large attachments may be assigned a cost equivalent to a longer thread without any attachments. Further, according to embodiments of the present invention, an organizational graph (e.g., Lightweight Directory Access Protocol (LDAP)) may be used to help establish a message management seniority hierarchy allowing a server or workflow system to identify individuals who can manage (i.e., impose budgets and shred a message) the message thread.

Embodiments according to the present invention provide the ability to programmatically assign costs to messages based upon parameters such as the number of recipients of the message, a length of the message, a size of attachments of the message, a message importance, etc., thereby reducing an overall cost associated with the message. An individual such as an original sender of a message or a relevant manager may make informed decisions based on a financial/cost impact of a message. Embodiments according to the present invention may be configured to decrease the network impact of emails and instant messages for regions that have network bandwidth issues. Further, as a message is being composed, a sender may associate a cost constraint with the message. Alternatively, a business or a sender's manager may intervene and impose a cost constraint on a message. As the message goes from person to person, the message notifies a recipient of the message of the total cost thus far. In addition, as the sender forwards the message, adding or modifying content and recipients of the string, a financial impact may be graphically shown. A message may not be allowed to be forwarded if the cost limitation by forwarding the message would be overrun for the current message thread.

Moreover, according to embodiments of the present invention, a message cost may be assessed based on a size of a message, a complexity of a message, a number of attachments, a size of attachments, a type of attachments, an organizational level of a sender and/or recipients of the message, a title of the person that is a sender and/or recipient of the message, a measured time a message is being displayed on a screen, a time taken to compose a message, or any other criteria or reasons. A complexity of a message may be determined by known language analysis engines that can determine a grade level or reading level of a particular message (e.g., number of acronyms, number of attachments, Gunning fog index, readability analysis, etc.). Depending on the cost, a recipient may make decisions on how to handle a message. The decision may include determining a message timeout, removing people from distribution from a message, reducing the number of people the message is sent to, sending the message at a less expensive time, etc. A client or server machine may determine a cost of a message. The client or server machine may also maintain a history of cost information as well as a breakdown of cost associated with a sender and each recipient of the message. A corporate department, an individual, a branch, or an entire corporation may each have a particular message budget where message threads that are sent and received are tracked and compared with the budget. Budgets may overlap and conflict and resolution methods addressing the conflicts may be performed by a client device or server accordingly.

Moreover, according to embodiments of the present invention, a server or system may check if the participants of the message or a significant subset of the participants can have a meeting scheduled to encompass the topics of the proposed message. The additional analysis may be particularly useful if there is little money left in a messaging budget. This provides the benefit of maintaining adherence to budgetary constraints for messages as well as reduced cost of messages. In some embodiments, details of this analysis may be presented to the recipients of the message string as an encouragement to select the least costly option.

According to embodiments of the present invention, cost may be associated only with messages which meet predetermined criteria. For example, message costs may be enabled if a threshold number of participants is exceeded, if the participants cross boundaries (e.g., corporate divisions, departments, groups, different companies, geographical areas, etc.), or other triggering events. Further, according to embodiments of the present invention, a sender or recipient of a message may have an option to turn off cost tracking of a particular message thread.

Cost in terms of time spent may be captured through a number of various ways such as, for example, through direct measurement, through client measurement, measurement of focus on a page, etc. In embodiments according to the present invention, times may also be estimated, for example, as a function of a complexity of language, length of message, topic of message, or through a lookup based on profiles and expertise of a sender and/or recipient(s) of the message.

Therefore, according to embodiments of the present invention, a cost may be a measurement that reflects an estimated cost or an actual cost. When actual time is captured, the measurements may be used as a supplementary source of information for billing, allocation to a specific project, allocation to a specific subject, etc. In addition, historical information may be kept and presented to a sender and/or recipient of the message allowing the person to see that their consumption of resources has decreased over time. The sender and/or recipient may see an average use of a particular message or a total number of messages across a particular department, industry, company, etc. Thus, the person may see targets for their particular enterprise, department, and/or for themselves personally. In this regard, the historical information may be in the form of a summary report (e.g., daily report, weekly report, monthly report, etc.). Further, the historical information may track separately outbound message, and inbound messages and provide reports regarding associated costs accordingly.

Moreover, according to embodiments of the present invention, some of the parameters that constitute cost may be manually defined (e.g., by an authorized person) or automatically calculated and estimated. For example, each invitee may be assigned a cost/weighting for a message per hour. The server or system may report to a sender of a message if the proposed message would exceed a cost limitation at the point before sending the message via any of various methods such as, for example, a pop up dialogue, message on the screen, an audible alert, an icon, or other such notifications, that may alert the sender to this fact. In embodiments according to the present invention, an authorized person (or the sender) may configure message handling such that an overall cost limitation associated with messages may have meta-budgets defined (e.g., technical support $5,000, etc.)

FIG. 1 shows a diagram of a system for controlling messages according to an exemplary embodiment of the present invention. A system may include one or more servers 101, 102, one or more mail servers 103, one or more wireless devices 117-119, and one or more workstations 104-109, where the servers 102, 102, wireless devices 117-119, and workstations 104-109 may be interconnected via a network 110. The wireless devices 117-119 may access the network 110 via one or more access points 120-122 or by any other common method. The wireless devices 117-119 may be any type of wireless device such as, for example, a mobile phone, a personal digital assistant (PDA), a portable game system, a laptop computer, etc. The network 110 may be the Internet, an intranet, a local area network, a wide area network, or any other type of network. Each server 101, 102, 103 may include a network interface 111, a processor 112, a memory 113, and other elements normally associated with a server. Similarly, each workstation 104-109 may include a network interface 114, a processor 115, and memory 116, and other items normally associated with a workstation. The network interface 111, 114, may be configured to receive and send messages from the server 101, 102, 103 or workstation 104-109 to a recipient at a workstation or client device 104-109 via the network 110.

The network interface 111, 114 may be configured to receive a message designating at least one recipient. The processor 112, 115 may be configured to determine a cost associated with the message and provide an indication of the cost. The processor may also be configured to evaluate the message or one or more attributes of at least one recipient based on a message cost policy and to provide the indication of the evaluation to the user or one or more of the recipients. A processor 112, 115, a workstation 104-109 and/or a server

101, 102, 103 may be configured to perform any or all of the various functions mentioned previously related to tracking and reporting costs associated with messages.

Figure 2:
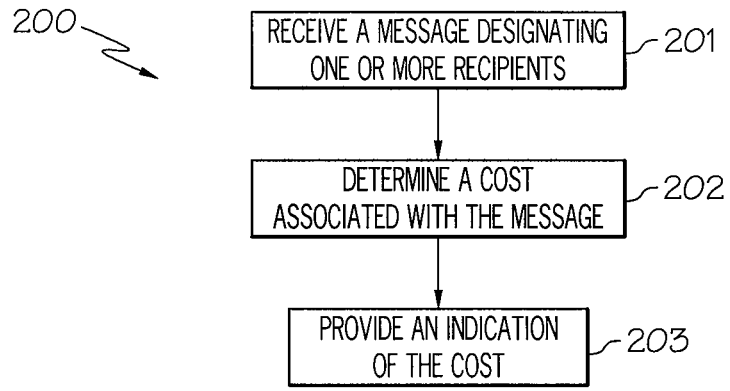
FIG. 2 is a flowchart of a process for cost management for messages according to an exemplary embodiment of the present invention.

FIG. 2 shows a flowchart of a process for cost management for messages according to an exemplary embodiment of the present invention. In the process 200, in block 201, a message designating one or more recipients may be received. In block 202, a cost associated with the message may be determined. In block 203, an indication of the determined cost may be provided to a recipient of the message. The recipient, client device or a server may then determine what action to take before providing the message to the user based on the cost. The determination may be based on policies that are in place or may be based on user selected criteria.

According to embodiments of the present invention, the one or more recipients may be associated with different groups, may be associated with different departments, may be associated with different companies, may be associated with different sections of the same company, or may be a part of any type of group, category or class of people. Policies that may be in place may be related to the type of group, category or class of people and/or may be related to the specific recipients.

Figure 3:
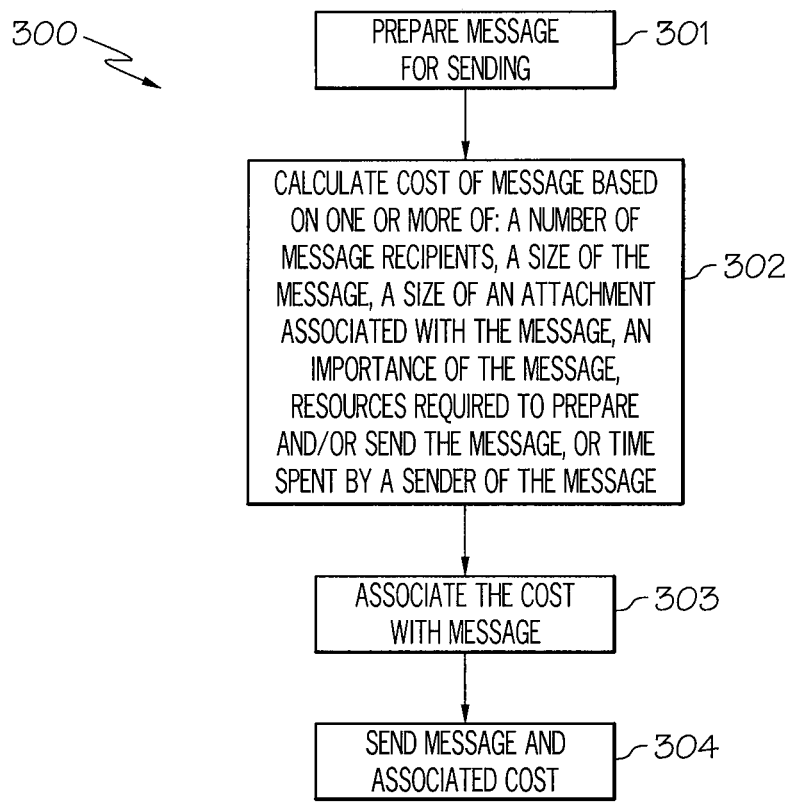
FIG. 3 is a flowchart of a process for cost management of messages according to another exemplary embodiment of the present invention.

FIG. 3 shows a flowchart of a process for cost management of messages according to another exemplary embodiment of the present invention. This process relates to the initial creation and sending of a message (i.e., no accumulated costs as of yet). In the process 300, in block 301, a message may be prepared for sending. In block 302, a cost of the message may be calculated based on one or more of: a number of message recipients, a size of the message, a size of an attachment associated with the message, an importance of the message, resources required to prepare and/or send the message, a complexity of the message, or time spent by a sender preparing the message. Time spent by a sender may be calculated based on a time when a new message was initiated compared with a time when the message was actually sent to a recipient. The one or more recipients may be separate individuals, may be associated with different groups, may be associated with different departments of a corporation, may be associated with different companies, may be associated with different sections of a same company, etc. In block 303, the cost may be associated with the message and then in block 304, the message and the associated cost may be sent to the designated recipients. The calculation may be done in a sending client device or a mail server. For example, a mail server may send usage information, and the client device may perform the calculations right before it's presented to a user at the client device. Further, a client device may have an exchange with a mail server and perform a calculation right before presentation of the cost to a user. Thus, if, for example, five other users had answered in between when the message was sent and when a recipient views it, an accurate cost would be presented based on this.

Figure 4:
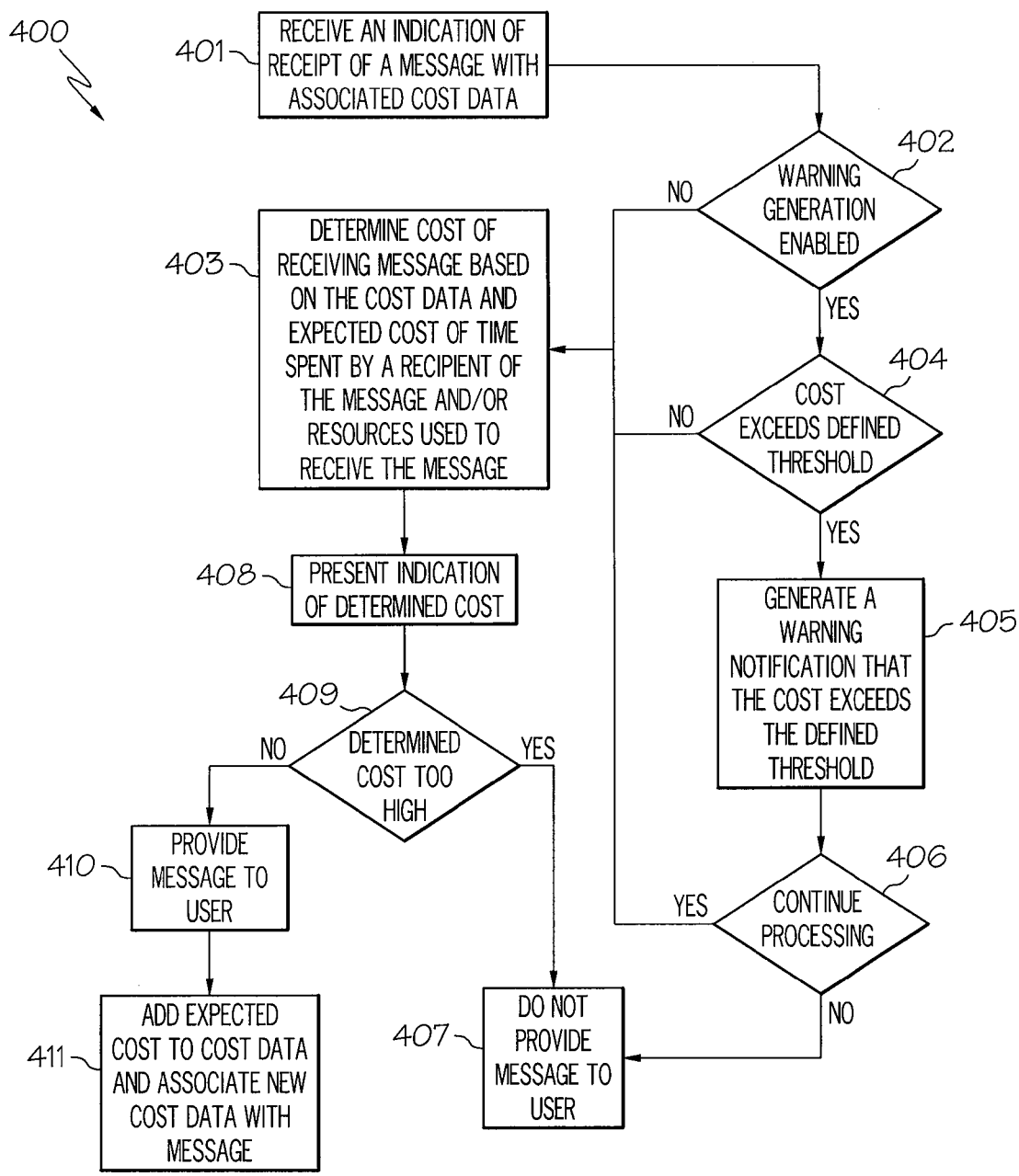
FIG. 4 is a flowchart of a process for cost management for messages according to a still further exemplary embodiment of the present invention.

FIG. 4 shows a flowchart of a process for cost management for messages according to a still further exemplary embodiment of the present invention. In the process 400, in block 401, an indication of receipt of a message may be received with an associated cost data. In block 402, it may be determined if message cost warning generation is enabled and if not, then in block 403, a cost of receiving message may be determined based on the cost data and expected cost of time spent by a recipient of the message and/or resources used to receive the message. A user may enable a warning to compare the received associated cost with a threshold value and alert the user that the cost of the message exceeds the threshold before the message is opened. If warning generation is enabled, then in block 404 it may be determined if the cost exceeds a defined threshold and if not, the process again proceeds to block 403 where a cost of receiving message may be determined based on the cost data and expected cost of time spent by a recipient of the message and/or resources used to receive the message. If the cost does exceed the defined threshold, then in block 405, a warning notification may be generated that the message cost exceeds the defined threshold. In block 406, it may be determined if it is desired to continue processing and if not, in block 407, the message may be not provided to the user.

If it is desired to continue processing, then the process may proceed again to block 403 where a cost of receiving message may be determined based on the cost data and expected cost of time spent by a recipient of the message and/or resources used to receive the message. Then in block 408, an indication of the determined cost may be presented. In block 409, it may be determined if the cost is too high and if so, then in block 407, the message may be ignored and not received. If it is determined that the cost is not too high, then in block 410, the message may be provided to the user and then in block 411 an expected or actual cost to view and receive the message may be added to the cost data and the associate new cost data may be added with the message.

The determination of the cost may be done in a sending client device, a mail server, or a receiving client device. For example, a mail server may send usage information, and the client device may perform the calculations right before it's presented to a user at the client device. Further, a client device may have an exchange with a mail server and perform a calculation right before presentation of the cost to a user. Therefore, if for example, five other users had answered the message in between when it was sent and when a recipient views it, an accurate cost based on this would be given to the recipient.

Figure 5:
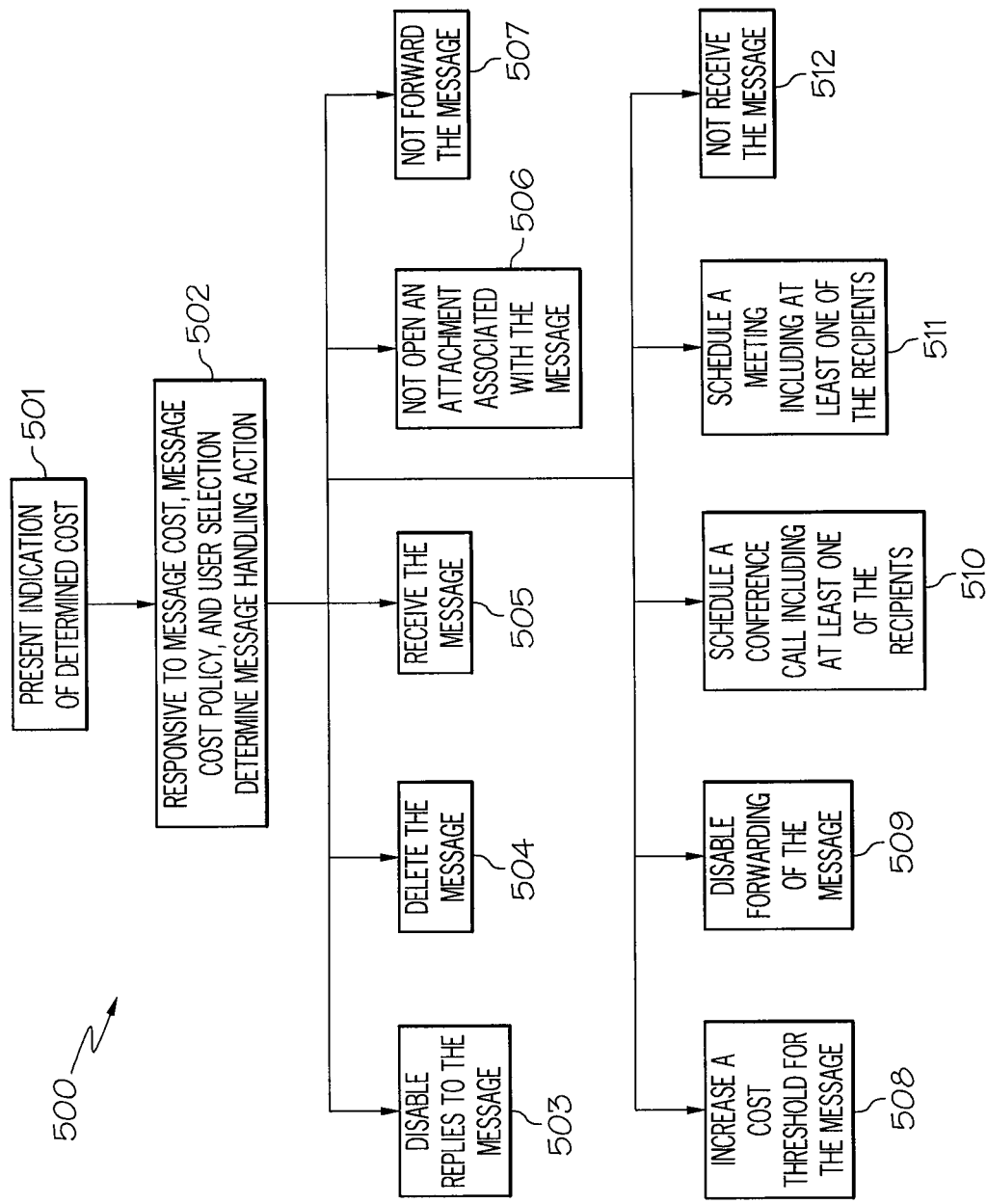
FIG. 5 is a flowchart of a process for cost management for messages according to another exemplary embodiment of the present invention.

FIG. 5 shows a flowchart of a process for cost management for messages according to another exemplary embodiment of the present invention. In the process 500, in block 501, an indication of a determined cost may be presented. In block 502, responsive to message cost, message cost policy, and user selection a message handling action is determined. The decision may be any of variety of decisions such as, for example, in block 503 replies to the message may be disabled, in block 504, the message may be deleted, in block 505, the message may be received, in block 506, an attachment associated with the message may not be opened, in block 507, the message may not be forwarded, in block 508, a cost threshold associated with the message may be increased, in block 509, forwarding of the message may be disabled, in block 510, a conference call including one or more of the recipients and the sender of the message may be scheduled, in block 511, a meeting including at least one of the recipients and the sender of the message may be scheduled, or in block 512, the message may not be received.

Figure 6:
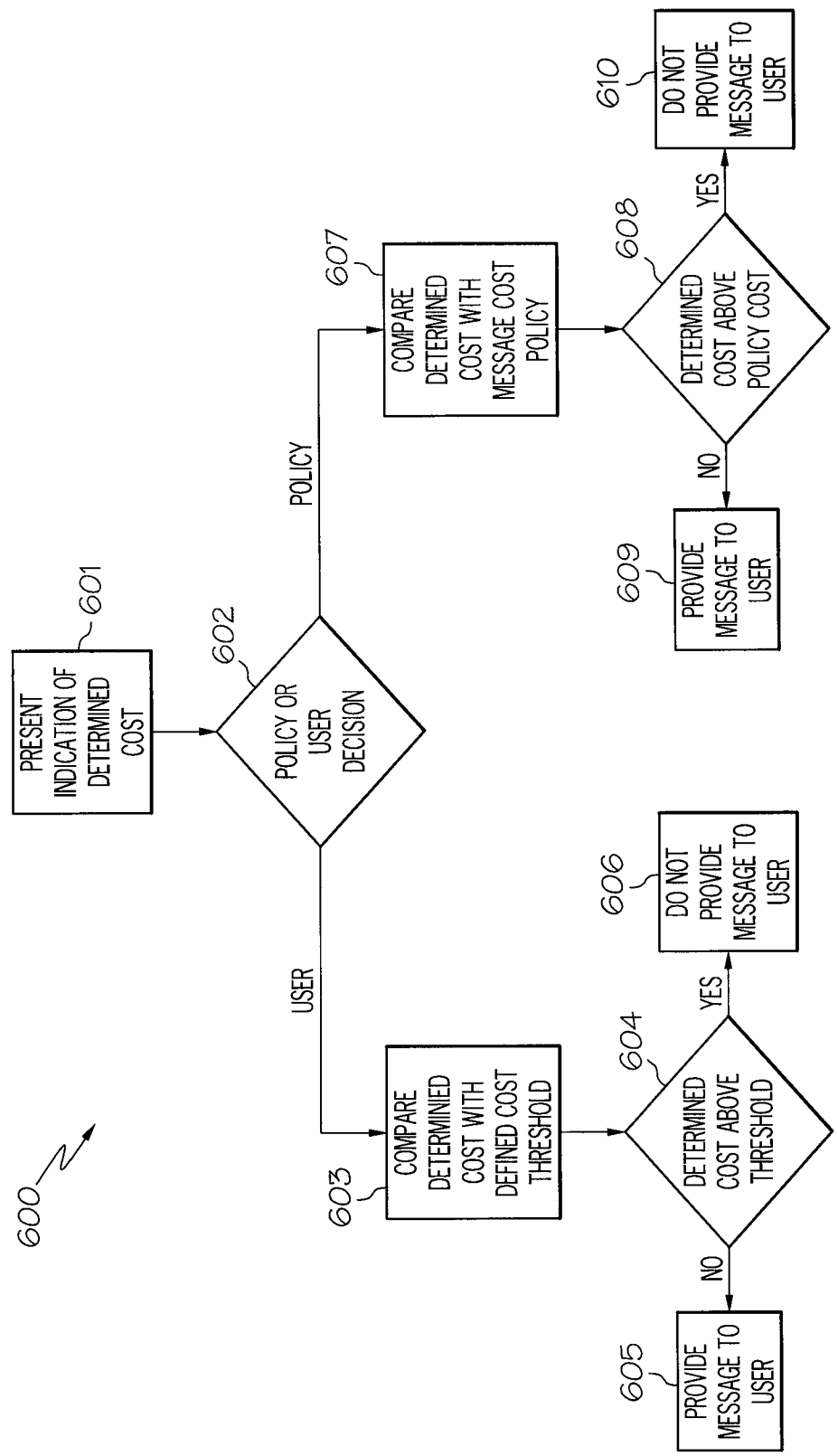
FIG. 6 is a flowchart of a process for decision making for cost management for messages according to another exemplary embodiment of the present invention.

FIG. 6 shows a flowchart of a process for decision making for cost management for messages according to another exemplary embodiment of the present invention. In the process 600, in block 601, an indication of a determined cost may be presented. In block 602, it may be determined whether message cost analysis and receipt is based on a policy or user selected criteria. If the message cost analysis and receipt is based on user selected criteria the in block 603, a determined cost of the message may be compared with a user defined cost threshold. In block 604, it may be determined if the cost is above the threshold and if not then in block 605 the message may be provided to the user. If it is determined that the cost is above the defined cost threshold, then in block 606, the message may not be provided to the user.

If the message cost analysis and receipt is based on a policy then in block 607, the determined message cost may be compared with a message cost policy. In block 608 it may be determined if the determined cost is above the policy cost and if not, then in block 609 the message may be provided to the user. If it is determined that the cost is above the policy cost, then in block 610 the message may not be provided to the user.

According to embodiments of the present invention, a server may control all cost tracking associated with sent and received messages. The server may include cost information as a number inside the message or it may include cost information as an attachment to the message. Further, the server may provide the indications of the cost information to a recipient of the message such that a recipient does not have to open and view the message. This gives the recipient the option of not opening the message or opening the message based on the indicated cost. Moreover, the server may estimate a cost for a recipient to open and view the message based on parameters noted previously. Further, if a message is opened and viewed, forwarded, other information attached and sent, etc., the server may track these activities, determine all associated costs, implement a total cost associated with the message, and provide the indication of this total cost to any subsequent recipient of the message. The server may also have access to demographic information on senders and receivers of messages that allows the server to apply various costs based on departments of users, locations of users, and other criteria noted previously. The server may also assign different weighting factors to different messages based on any of a variety of criteria. The weight assigned to a message may increase or reduce the cost of the message, determine an importance of the message, or perform other functions.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention has other applications in other environments. This application is intended to cover any adaptations or variations of the present invention. The following claims are in no way intended to limit the scope of embodiments of the invention to the specific embodiments described herein.

What is claimed is:

1. A method for cost management for messages operable on a processing device comprising:
   receiving, by a processing device, a message designating a recipient;
   determining, by the processing device, a cost associated with the message;
   associating the cost with the message by the processing device in response to the message meeting a predetermined criteria, wherein associating the cost with the message comprises associating a cost of creating the message and a resource cost with the message, the cost of creating the message being based on a profile and expertise of a sender, wherein the predetermined criteria comprises a number of recipients exceeding a defined threshold and at least one of the recipients being associated with a different section of a same company as the sender;
   sending the message and the associated cost by the processing device to the recipient in response to the message meeting the predetermined criteria and the cost being associated with the message; and
   sending the message by the processing device to the recipient in response to the message not meeting the predetermined criteria for associating the cost with the message.

2. The method according to claim 1, wherein determining a cost associated with the message further comprises evaluating, by the processing device, at least one of the message and an attribute of the recipient based on a message cost policy.

3. The method according to claim 1, further comprising providing, by the processing device, an indication of the cost to the recipient.

4. The method according to claim 1, wherein the cost comprises at least one of a financial cost, and a time cost.

5. The method according to claim 1, further comprising assigning, by the processing device, a relative weight to at least one of the message and receipt of the message by the recipient, the relative weight being a multiplier for the cost.

6. The method according to claim 1, wherein the cost comprises at least one of a monetary amount and a point value.

7. The method according to claim 1, further comprising receiving a decision from the recipient related to the message responsive to the cost.

8. The method according to claim 7, wherein the decision comprises one of disabling replies to the message, and disabling forwarding of the message.

9. The method according to claim 1, further comprising making a decision related to the message responsive to the cost exceeding a defined threshold.

10. The method according to claim 1, further comprising generating, by the processing device, a warning notification when the cost exceeds a defined threshold.

11. The method according to claim 1, further comprising assigning, by the processing device, the cost associated with the message based on a total number of recipients, a size of the message, a size of an attachment associated with the message, an importance of the message, resources required, time spent by the sender of the message, and time spent by the recipient of the message.

12. The method according to claim 1, further comprising assigning, by the processing device, a cost constraint associated with the message by one of the sender of the message and another person who is not the sender of the message.

13. The method according to claim 1, further comprising enabling cost tracking of the message, by the processing device, before sending the message, enabling cost tracking being responsive to at least one of the number of recipients exceeding the defined threshold, the recipient being associated with different departments, the recipient being associated with different groups, the recipient being associated with different companies, and the recipient being associated with different sections of the same company.

14. The method according to claim 1, wherein the cost comprises a time cost, the time cost being determined from at least one of a direct measurement of time spent generating and sending the message, a direct measurement of time spent viewing the message, estimating a time spent on at least one of generating, sending and viewing the message based on a complexity of the language of the message, a size of the message, a subject of the message, at least one sender or receiver profile, and an expertise of at least one of the sender of the message and the recipient.

15. The method according to claim 1, further comprising generating, by the processing device, historical cost information for at least one of the sender of the message and the recipient.

16. A computing device for cost management for messages comprising:
  a network interface in the computing device, the network interface being configured to receive a message designating a recipient; and
  a processor in the computing device, the processor configured to determine a cost associated with the message and to associate the cost with the message in response to the message meeting a predetermined criteria, wherein the message and the associated cost are sent to the recipient by the processing device in response to the message meeting the predetermined cost and the cost being associated with the message and the message being sent to the recipient in response to the message not meeting the predetermined criteria for associating the cost with the message, wherein the predetermined criteria comprises a number of recipients exceeding a defined threshold and at least one of the recipients being associated with a different section of a same company as the sender and wherein the cost associated with the message comprises a cost of creating the message to a first recipient and a resource cost, the cost of creating the message being based on a profile and expertise of a creator of the message.

17. The computing device according to claim 16, wherein the processor is configured to evaluate at least one of the message and the recipient based on a message cost policy and to provide the indication of the evaluation to at least one of the user and the recipient.

18. A computer program product comprising a computer readable storage medium, that is not a signal propagating medium, said computer readable storage medium having computer readable program code embodied therein, the computer readable program code comprising:
  computer readable program code configured to receive a message designating a recipient
  computer readable program code configured to determine a cost associated with the message, wherein determining a cost associated with the message comprises determining a cost of creating the message to a first recipient and a resource cost, the cost of creating the message being based on a profile and expertise of a creator of the message;
  computer readable program code configured to associate the cost with the message by the processing device in response to the message meeting a predetermined criteria, wherein the predetermined criteria comprises a number of recipients exceeding a defined threshold and at least one of the recipients being associated with a different section of a same company as the sender;
  computer readable program code configured to send the message and the associated cost to the recipient in response to the message meeting the predetermined criteria and the cost being associated with the message; and
  computer readable program code configured to send the message to the recipient in response to the message not meeting the predetermined criteria for associating the cost with the message.

19. The computer program product according to claim 18, further comprising computer readable program code configured to evaluate at least one of the message and the recipient based on a message cost policy and computer readable program code configured to provide the indication of the evaluation to at least one of the user and the recipient.

20. The method according to claim 1, wherein the cost comprises a time cost, the time cost being determined from at least one of a direct measurement of time spent generating and sending the message and estimating a time spent on generating and sending the message based on at least one of a complexity of the language of the message, a size of the message, a subject of the message, at least one of the sender or receiver profile, and an expertise of at least one of a sender of the message and the recipient, and a measurement of use of resources.

21. The method of claim 1, further comprising:
  providing a message budget for at least one of an individual and a group of individuals for a preset time period, the message budget corresponds to the cost of messages exchanged between persons; and
  comparing the cost for a plurality of messages to the message budget for at least one of the individual and the group of individuals.

22. The method of claim 21, further comprising resolving conflicts between overlapping message budgets for the individual and the group including the individual.

23. The method of claim 21, further comprising resetting the message budget after expiration of each preset time period.

\* \* \* \* \*